(12) United States Patent  (10) Patent No.: US 6,548,772 B2
Liburdi  (45) Date of Patent: Apr. 15, 2003

(54) MULTIFUNCTION SWITCH POD

(75) Inventor: Steve Liburdi, Clinton Township, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/841,765

(22) Filed: Apr. 24, 2001

(65) Prior Publication Data

US 2001/0035337 A1 Nov. 1, 2001

Related U.S. Application Data

(60) Provisional application No. 60/202,023, filed on May 4, 2000.

(51) Int. Cl.[7] .................................................. H01H 9/00

(52) U.S. Cl. ...................... 200/61.54; 200/5 R; 200/5 A

(58) Field of Search ..................... 200/61.54, 61.55–57, 200/5 R, 5 A, 296; 307/10 R, 101

(56) References Cited

U.S. PATENT DOCUMENTS

| | | | |
|---|---|---|---|
| 4,518,836 A | * | 5/1985 | Wooldridge ............. 200/61.54 |
| 4,578,592 A | | 3/1986 | Nakazawa et al. |
| 5,403,981 A | | 4/1995 | Chen et al. |
| 5,847,346 A | * | 12/1998 | Hoskins et al. ........ 200/11 TW |
| 5,977,494 A | | 11/1999 | Sano et al. |

* cited by examiner

*Primary Examiner*—Anh Mai
*Assistant Examiner*—Marina Fishman
(74) *Attorney, Agent, or Firm*—Brooks & Kushman, P.C.

(57) ABSTRACT

A multifunction switch pod or controller for controlling electronic vehicular features such as the windshield wipers and headlamps. The multifunction switch pod or controller comprises at least one circuit board having a front surface and at least one solid state rotatable dial attached to the circuit board. The multifunction switch pod or controller may further comprise push-button switch cells attached to the circuit board for controlling additional electronic vehicular features. A cover covers the circuit board for protection from the environment.

19 Claims, 3 Drawing Sheets

MULTIFUNCTION SWITCH POD

CROSS-REFERENCE TO RELATED APPLICATION

This application claims the benefit of U.S. provisional application Ser. No. 60/202,023, filed May 4, 2000.

BACKGROUND OF THE INVENTION

1. Field of the Invention

The invention relates to a multifunction switch pod or a controller having solid state rotatable dials for controlling electronic vehicular features.

2. Background Art

In the prior art, electronic vehicular features, such as turn signals and windshield wiper blades, are controlled using mechanical stalk switches. Stalk switches are switches that rotate about a vehicle's steering wheel column. Mechanical stalk switches have limited functionality due to the complex mechanical linkages needed to connect the stalk switches to the wire harness. Even more complexity arose when manufacturers attempted to illuminate the stalk switches or add additional features to the stalk switching. Further, these switches are bulky and each switch required 3 to 8 cubic inches of space in the area immediately surrounding the steering column cover since most of the electronics are inside of the cover.

SUMMARY OF THE INVENTION

The multifunction switch pods or controllers of the present invention, which are miniature instrument clusters mounted on the column, eliminate many of the problems associated with the prior art mechanical stalk switches by incorporating solid state, rotatable dials on circuit boards to replace the cumbersome stalk switches. The dials are adaptable to a greater number of functions without added complexity or cumbersome mechanical linkages. Because diodes can be placed essentially anywhere on the circuit boards and graphics can be placed anywhere on the controller covers, illuminating the graphics becomes a very easy task.

According to the present invention, a steering wheel mounted multifunction switch pod or controller for controlling electronic vehicular functions has at least one circuit board. The circuit board includes at least one rotatable dial connected thereto. The circuit board may further include a plurality of switch cells or rubber membrane switch pills. Additionally, the circuit board may include a plurality of diodes or other illuminating devices. A circuit board cover protects the circuit board and may contain a plurality of push buttons which are in alignment with the switch cells. Pressing the push buttons activates the switch cells underneath. Alternatively, the cover may have openings proximate the switch cells or rubber membrane switch pills for the switch cells or switch pills to extend through. Further, the circuit board cover may include a plurality of graphics which are in alignment with the diodes or the push button itself may include a graphic. When the diodes are activated, the corresponding graphic is illuminated to enable a user to locate the push buttons in low light situations and determine the status of the electronic functions.

DETAILED DESCRIPTION OF THE PREFERRED EMBODIMENT(S)

Figure 1:
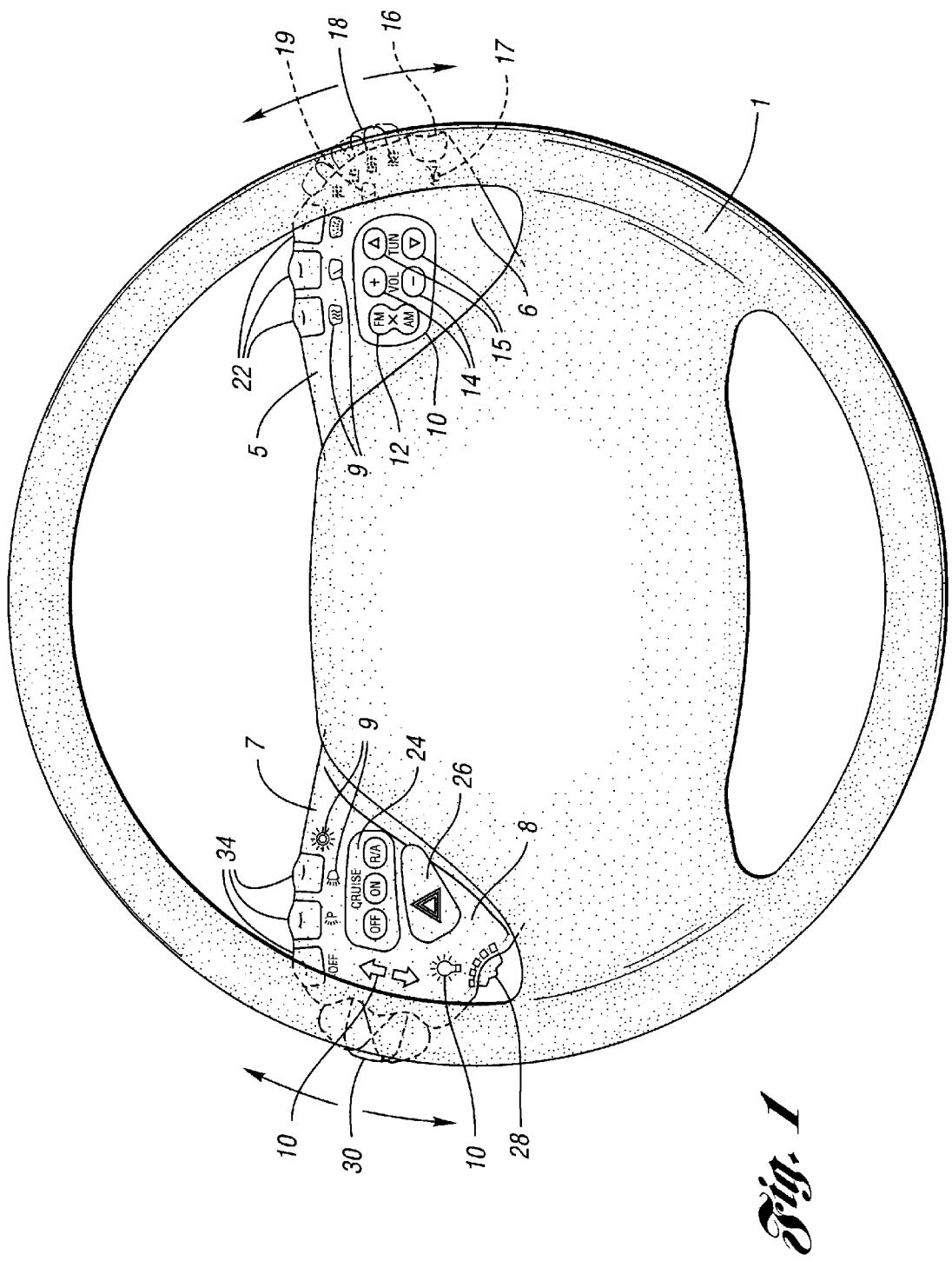
FIG. 1 is a front view of the controllers of the present invention seen from a vehicle driver's perspective.
Figure 2:
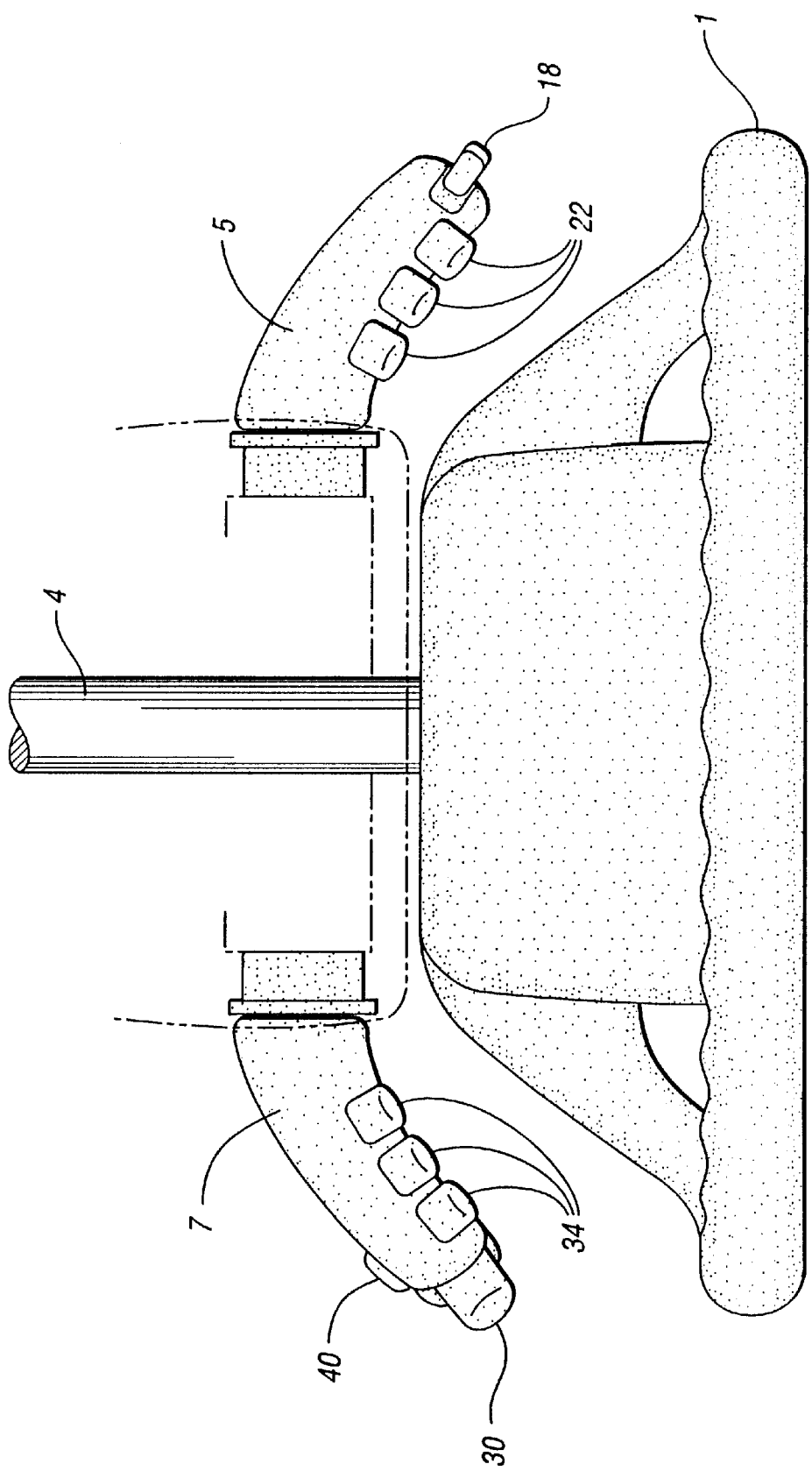
FIG. 2 is a top plan view of the controllers of the present invention.

Referring to FIGS. 1 and 2, multifunction switch pods or controllers 5 and 7 are positioned behind steering wheel 1 and attached to steering wheel column 4 using any known method. Each controller 5 and 7 is comprised of a circuit board 50, 52 (shown in FIG. 3) that controls various electronic functions of an automobile including the windshield wipers and windshield washer, horn, radio controls, head lamps, hazards, dimmer dial, cruise control, and turn signal. Alternatively, a single circuit board can be used. Each circuit board 50, 52 has a front surface 70, 72 facing the interior of a vehicle.

Right printed circuit board 50 is protected from the environment by a right circuit board cover or controller cover 6. Similarly, left printed circuit board 52 is protected from the environment by a left circuit board cover or controller cover 8. Covers 6, 8 may contain various graphics which illustrate the functions controllable from controllers 5, 7. For example, arrows would be used to indicate that the turn signal has been activated. The graphics may be backlit by placing diodes 60 (shown in FIG. 3) or other illuminating means on the circuit board underneath or proximate the graphics to enhance the visibility of the graphics in low light situations. The planar backlit surfaces reduce glare by not reflecting off the windshield.

As an example for illustrative purposes only, right controller 5 contains push buttons for the radio control 10 which include a volume control 14, a tuning control 15, and a band selector 12. The push buttons may have graphics 9 adjacent to or on the push button itself that may be illuminated by placing diodes or other illuminating means on the circuit board underneath or proximate the graphics 9. Additionally, a push button for the horn activator 16 and a separate illuminated horn graphic 17 may also appear on the right controller 5. Push buttons for right auxiliary controls 22 may also be positioned on the right controller 5 to control various electronic automotive functions such as the rear defrost and the rear windshield wipers.

Also, the right controller 5 has a rotatable dial 62 (shown in FIG. 3) for controlling the front windshield wiper control 18. The dial 62 is connected to the front surface 70 of circuit board 50 and rotates about an axis perpendicular to front surface 70 of the circuit board. Preferably, the rotating axis will be perpendicular to the surface, but variations due to manufacturing may cause the axis to be not perfectly perpendicular. Further, the rotating axis may be chosen to be a different angle to the surface to match the fit and contour of the covers. The dial 62 is a solid state device that replaces the standard stalk switches used in the prior art. By making the switch solid state, the dial 62 eliminates the complexities that arose from previous mechanical switches or devices. The windshield wiper control 18 rotates to allow a user to adjust the speed of the windshield wipers from a mist function to interval wiping to low/high speed wiping. An illuminated windshield wiper signal 19 may also be present on the right controller 5.

As a further example, and not as a limitation, the left controller 7 has a variety of push button controls for a cruise control 24, a hazard control 26, and left auxiliary controls 34. In addition to the push button controls, the left controller 7 has two rotatable dials 62—a light dimmer dial 28 rotates to adjust the intensity of interior lighting, and a turn signal control 30 rotates to signal vehicle turning. Each of the controls on the left controller 7 may contain illuminated graphics 9 to illustrate the purpose of the push buttons and dials, such as illuminated arrows for the turn signal and lamps for the head lamps.

Referring to FIG. 2, a beam select switch 40 may be positioned on the back of the left controller 7 which requires the user to push the button in the direction toward the driver. This simulates the standard stalk switch design, where the user would select the beam by moving the stalk back and forth, but without the mechanical complexity. Illuminated graphics on the left controller cover 8 or elsewhere would indicate to the user which beam was selected.

Figure 3:
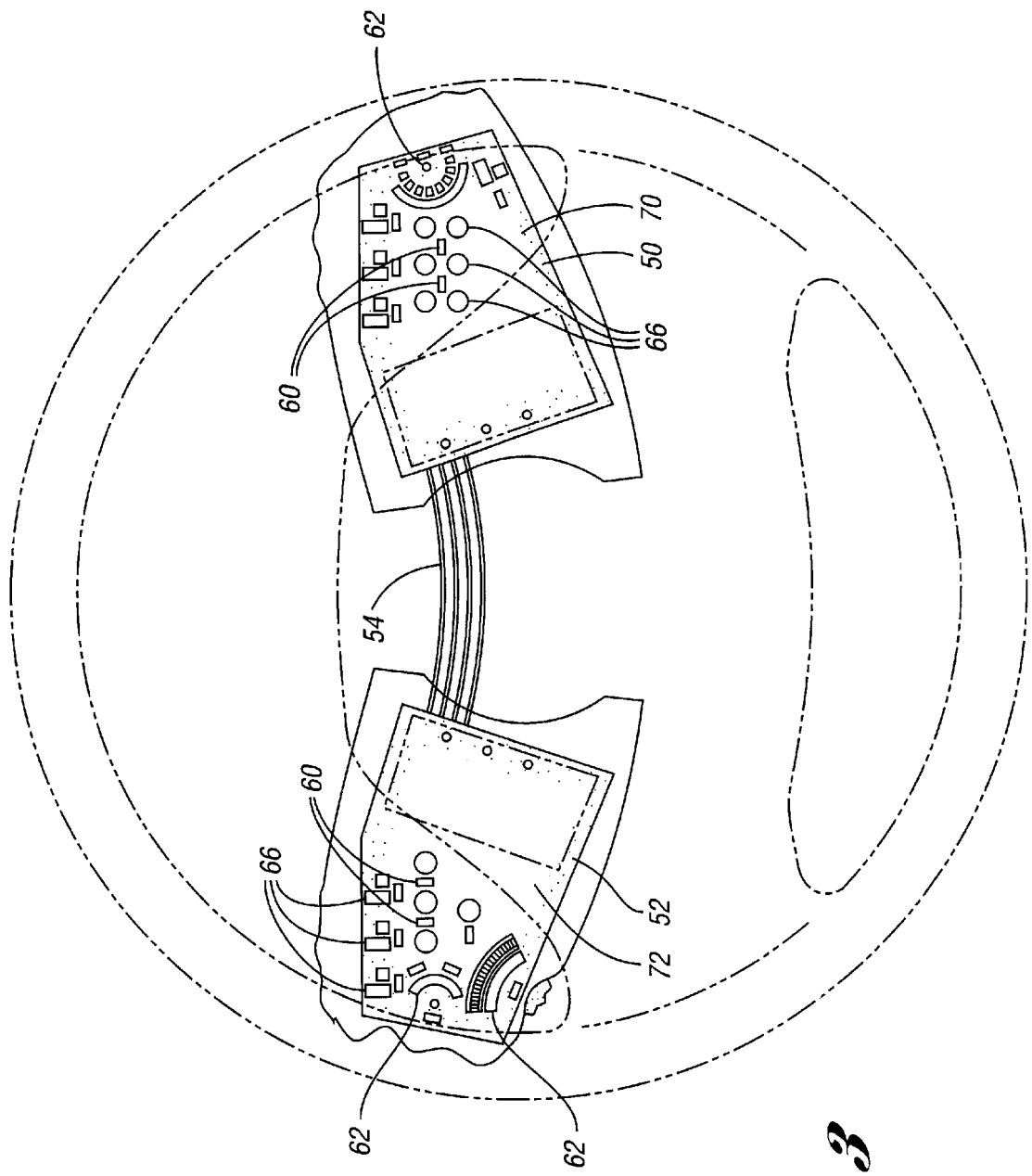
FIG. 3 is a front view of the circuit boards of the present invention.

Referring to FIG. 3, the left and right controller covers 6 and 8 are removed to show the right and left printed circuit boards 50 and 52. A flexible circuit connection 54 connects the two controllers. Circuit boards 50 and 52 could also be manufactured as a single circuit board. The right printed circuit board 50 contains a plurality of push-button switch cells 66 to operate the radio control 10, the horn 16, and the right auxiliary controls 22. The switch cells may be activated by directly pushing the switch cells through openings in controller covers 6 and 8, by pushing the covers 6 and 8 into the switch cells, or by pushing a push button attached to covers 6 and 8 proximate the switch cells. Diodes 60 illuminate graphics 9 on the right controller cover 6 to allow the user to locate the buttons in low light situations and show the user the status of the various electronic functions.

The left printed circuit board 52 also comprises a plurality of push button controls to operate the hazards, cruise control, and the left auxiliary controls 34. Diodes 60 present on the left circuit board illuminate graphics 10 on cover 8 to allow the user to find the buttons in low light situations and show the user the status of the electronic functions. Two rotating dials 62 control the light dimmer 28 and the turn signal 30.

Additionally, mounting the multifunction switch pod or controller is much simpler than mounting some of the prior art stalk switches. All the electronics and controls are integrated in the controller. To mount the controllers, the individual controllers are attached to a central hub around the steering wheel column. If the controllers are a single circuit board, or two connected circuit boards, the board can be dropped over the steering column before the steering wheel is fastened. Lastly, one wire harness plug is used to connect the controller or multifunction pod to the vehicle. Other attachment methods are also possible without deviating from the scope of this invention.

Circuit boards 50, 52 are connected to a microprocessor (not shown). The microprocessor may either be included as part of the controllers or may be a central processor on the vehicle.

While the best mode for carrying out the invention has been described in detail, those familiar with the art to which this invention relates will recognize various alternative designs and embodiments for practicing the invention without departing from the spirit and scope of the invention described herein.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A multifunction switch pod attached to a steering wheel column of a vehicle and positioned behind a steering wheel of the vehicle for controlling electronic vehicular features comprising:
    at least one circuit board having a front surface facing an interior of the vehicle in a direction towards a vehicle operator seated in front of the steering wheel;
    at least one solid state, rotatable dial directly mounted onto the front surface of the circuit board and facing in the direction towards the vehicle operator for controlling at least one vehicular feature, wherein the rotatable dial is rotatable about an axis perpendicular to the front surface of the circuit board to be rotated about the steering wheel column by the vehicle operator; and
    a cover to cover the circuit board.

2. The multifunction switch pod of claim 1 further comprising at least one switch cell to control an electronic vehicular function, the switch cell attached to the circuit board.

3. The multifunction switch pod of claim 2 wherein the cover comprises openings proximate the switch cells, and wherein said switch cells extend therethrough.

4. The multifunction switch pod of claim 2 wherein the switch cell is a push button-type switch.

5. The multifunction switch pod of claim 4 wherein the switch cell activates vehicle head lamps.

6. The multifunction switch pod of claim 1 wherein the rotatable dial controls front windshield wipers.

7. The multifunction switch pod at claim 1 wherein the rotatable dial controls vehicle turn signals.

8. The multifunction switch pod of claim 1 further comprising graphics on the cover and diodes attached to the circuit board proximate the graphics for illumination of the graphics.

9. A multifunction controller attached to a steering wheel column of a vehicle and positioned behind a steering wheel of the vehicle for controlling electronic vehicular features comprising:
    at least one circuit board having a front surface facing an interior of the vehicle in a direction towards a vehicle operator seated in front of the steering wheel;
    at least one solid state, rotatable dial directly attached to the front surface of the circuit board and facing in the direction towards the vehicle operator, wherein the rotatable dial is rotatable about an axis perpendicular to the front surface of the circuit board to be rotated about the steering wheel column by the vehicle operator for controlling at least one vehicular feature;
    at least one switch cell attached to the circuit board; and
    a controller cover to cover the circuit board.

10. The multifunction controller of claim 9 further comprising graphics on the controller cover and diodes connected to the circuit board proximate the graphics for illumination of the graphics.

11. The multifunction controller of claim 9 wherein the controller cover has openings proximate the switch cell, and wherein the switch cells extend therethrough.

12. A multifunction switch pod attached to a steering wheel column of a vehicle and positioned behind a steering wheel of the vehicle for controlling electronic vehicular features comprising:
    at least one circuit board having a front surface facing an interior of the vehicle in a direction towards a vehicle operator seated in front of the steering wheel;
    at least one solid state, rotatable dial directly attached to the front surface of the circuit board and facing in the direction towards the vehicle operator, wherein the rotatable dial is rotatable about an axis perpendicular to the front surface of the circuit board to be rotated about the steering wheel column by the vehicle operator for controlling at least one vehicular feature;

at least one switch cell attached to the circuit board for controlling at least one vehicular feature; and a circuit board cover to cover the circuit board, the cover having at least one push button, the push button aligned with the switch cell.

13. The multifunction switch pod of claim 12 further comprising graphics on the circuit board cover and diodes attached to the circuit board proximate the graphics for illumination of the graphics.

14. The multifunction switch pod of claim 1 further comprising a second circuit board and a flexible circuit connection, the second circuit board connected to the at least one circuit board using the flexible circuit connection.

15. The multifunction switch pod of claim 2 wherein the switch cell is activated by depressing the cover directly into the switch cell.

16. The multifunction switch pod of claim 9 further comprising a second circuit board and a flexible circuit connection, the second circuit board connected to the at least one circuit board using the flexible circuit connection.

17. The multifunction switch pod of claim 9 wherein the switch cell is activated by depressing the cover directly into the switch cell.

18. The multifunction switch pod of claim 12 further comprising a second circuit board and a flexible circuit connection, the second circuit board connected to the at least one circuit board using the flexible circuit connection.

19. The multifunction switch pod of claim 12 wherein the switch cell is activated by depressing the cover directly into the switch cell.

* * * * *